United States Patent
Varanasi et al.

(10) Patent No.: US 7,443,799 B2
(45) Date of Patent: Oct. 28, 2008

(54) LOAD BALANCING IN CORE-EDGE CONFIGURATIONS

(75) Inventors: Surya Varanasi, San Ramon, CA (US); Timothy Millet, Mountain View, CA (US); Kung-Ling Ko, Union City, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 903 days.

(21) Appl. No.: 10/699,568

(22) Filed: Oct. 31, 2003

(65) Prior Publication Data
US 2005/0094633 A1   May 5, 2005

(51) Int. Cl.
*H04L 1/00* (2006.01)
(52) U.S. Cl. .................. 370/238; 370/386; 370/389
(58) Field of Classification Search ............ None
See application file for complete search history.

(56) References Cited

U.S. PATENT DOCUMENTS

| | | | | |
|---|---|---|---|---|
| 5,742,604 A * | 4/1998 | Edsall et al. | | 370/401 |
| 5,835,482 A | 11/1998 | Allen | | 370/225 |
| 5,838,681 A | 11/1998 | Bonomi et al. | | 370/395 |
| 5,872,930 A | 2/1999 | Masters et al. | | 395/200 |
| 5,930,254 A | 7/1999 | Liron et al. | | 370/395 |
| 6,055,228 A | 4/2000 | DeKoning et al. | | 370/258 |
| 6,072,797 A | 6/2000 | Fletcher | | 370/394 |
| 6,101,190 A | 8/2000 | Song | | 370/411 |
| 6,262,974 B1 | 7/2001 | Chevalier et al. | | 370/232 |
| 6,363,077 B1 | 3/2002 | Wong et al. | | 370/422 |
| 6,400,681 B1 | 6/2002 | Bertin et al. | | 370/218 |
| 6,532,212 B1 * | 3/2003 | Soloway et al. | | 370/230 |
| 6,690,671 B1 | 2/2004 | Anbiah et al. | | 370/395.43 |
| 6,829,215 B2 | 12/2004 | Tornar | | 370/223 |
| 6,847,647 B1 | 1/2005 | Wrenn | | 370/395.32 |
| 6,862,293 B2 * | 3/2005 | Lay et al. | | 370/420 |
| 6,898,189 B1 | 5/2005 | Di Benedetto et al. | | 370/256 |
| 6,901,048 B1 | 5/2005 | Wang et al. | | 370/228 |
| 6,985,956 B2 * | 1/2006 | Luke et al. | | 709/229 |
| 7,050,392 B2 | 5/2006 | Valdevit | | 370/228 |
| 7,120,728 B2 * | 10/2006 | Krakirian et al. | | 711/6 |
| 2002/0075540 A1 | 6/2002 | Munter | | 359/232 |
| 2002/0156918 A1 * | 10/2002 | Valdevit et al. | | 709/238 |
| 2004/0024906 A1 | 2/2004 | Valdevit et al. | | 709/241 |
| 2004/0064583 A1 | 4/2004 | Dani et al. | | 709/241 |
| 2004/0071134 A1 | 4/2004 | Validvelu | | 370/241 |
| 2005/0094649 A1 * | 5/2005 | Varanasi et al. | | 370/396 |
| 2005/0105904 A1 * | 5/2005 | Varanasi et al. | | 398/43 |

(Continued)

OTHER PUBLICATIONS

Valdevit, Fabric Shortest Path First (FSPF) Revision 0.1, Brodecade, pp. 1-10, Mar. 2000.*

(Continued)

*Primary Examiner*—Frank Duong
(74) *Attorney, Agent, or Firm*—Wong, Cabello, Lutsch, Rutherford, & Brucculeri, LLP

(57) ABSTRACT

Embodiments of methods, apparatuses and/or systems for routing a flow of frame in a core-edge switch configuration are disclosed. For example, a method of routing a flow of frames may include receiving at least one frame; selecting an exit port of a switch for the at least one frame to exit based, at least in part, on balancing frame traffic in the core-edge switch configuration; and transmitting the at least one frame.

35 Claims, 5 Drawing Sheets

U.S. PATENT DOCUMENTS

2005/0281196 A1    12/2005    Tornetta et al. ............. 370/235

OTHER PUBLICATIONS

Tech Node, Exploring Brodecade ISL Trunking, Brodecade, pp. 1-26, Jan. 2002.*

Tech Note: Exploring Brodecade ISL Trunking, pp. 1-26, Jan. 2002.*

Link Trunking and Measuring Link Latency in Fibre Channel Fabric, Inventors: David C. Banks, et al., U.S. Appl. No. 10/135,615, filed Apr. 30, 2002, 39 Pgs.

Load Banlancing in a Network Comprising Communication Paths Having Different Bandwidths, U.S. Appl. No. 10/208,969, filed Jul. 31, 2002, 24 Pgs.

Dynamic Path Selection With In-Order Delivery Within Sequence in a Communication Network, U.S. Appl. No. 10/059,760, filed Jan. 29, 2002, 46 Pgs.

U.S. Appl. No. 10/609,230, filed Jun. 26, 2007, Pelissier et al.

"*Fibre Channel Methodologies for Interconnects (FC-MI) Rev 1.8;*" NCITS Working Draft Proposed Technical Report; Sep. 28, 2001; pp. Start to 11, 41-60.

"*Fibre Channel—Fabric Generic Requirements (FC-FG);*" American National Standards Institute; Dec. 4, 1996; Start to 23.

"*Fibre Channel Physical and Signaling Interface (FC-PH) Rev 4.3;*" American National Standards Institute Working Draft; Jun. 1, 1994; pp. Start to 32.

Burton, Robert C.; "*Fibre Channel;*" pp. 1-11; [online] ftp://ftp.netlab.ohio-state.edu/pub/jain/courses/cis788-95/fibre_channel/indes.html, 1995.

* cited by examiner

LOAD BALANCING IN CORE-EDGE CONFIGURATIONS

CROSS REFERENCE TO RELATED APPLICATIONS

This patent application is related to concurrently filed patent applications, "Frame Traffic Balancing Across Trunk Groups," by Surya Varanasi, filed on 10/31/03, U.S. patent application Ser. No. 10/698,851, and "Logical Ports in Trunking," by Surva Varanasi, filed on Oct. 31, 2003 U.S. patent application Ser. No. 10/699,567, both of the foregoing assigned to the assignee of the presently claimed subject matter and herein incorporated by reference.

BACKGROUND

1. Field

This application relates generally to networking and, more particularly, to routing data traffic within a communications networking system.

2. Background Information

As used herein, the term "Fibre Channel" refers to the Fibre Channel family of standards (hereinafter referred to as "Fibre Channel") developed by the American National Standards Institute (ANSI). In general, Fibre Channel defines a transmission media based at least in part on high speed communications interfacing for the transfer of large amounts of data via communicatively coupled devices, including, for example, such devices as personal computers, workstations, servers, mainframes, supercomputers, and storage devices. Use of Fibre Channel, the Fibre Channel protocol, or the Fibre Channel standard, all of the foregoing used interchangeably throughout this specification, is proliferating in a variety of applications, including, for example, client/server applications which may, for example, employ high bandwidth and/or low latency input/output techniques. Examples of such applications include mass storage, medical and scientific imaging, multi-media communications, transactions processing, distributed computing and distributed database processing applications, just to name a few.

Although the claimed subject matter is not limited in scope to systems that are compliant with the Fibre Channel set of standards, it provides a helpful reference point with respect to network data communications. For systems that are Fibre Channel compliant, for example, communications between devices is typically facilitated over a switch fabric. The switch fabric is typically constructed from one or more Fibre Channel compliant switches or other devices. In one such structure, each device may be coupled to the fabric. Thus, devices coupled to the fabric are capable of communicating with the other devices coupled to the fabric, although, of course, this is merely an illustrative example and the claimed subject matter is not limited in scope to such an example.

However, one disadvantage of Fibre Channel compliant protocol devices is that frame traffic between a source device and a destination device are to be delivered "in-order" as part of being Fibre Channel compliant. Unfortunately, however, in a variety of circumstances, "in-order" delivery may result in frame routing techniques that result in increased congestion and/or delay over what might occur if "in-order" delivery of frames or packets were not accommodated.

To provide an example, certain traffic patterns in a fabric may result in active routes being allocated to particular or selected available paths thereby creating a high probability of congestion. It would be more desirable, instead, if, for example, frame traffic could be at least roughly evenly distributed across available paths; however, to result in "in-order" delivery, frequently, frame traffic is allocated to a single available path or to a subset of the available paths. A need therefore exists to reduce frame traffic congestion and/or to provide greater balance of frame traffic across a variety of available paths while maintaining "in-order" delivery of frames.

BRIEF DESCRIPTION OF DRAWINGS

The claimed subject matter may best be understood by referring to the following detailed description when read with reference to the accompanying drawings in which:

DETAILED DESCRIPTION

Figure 1:
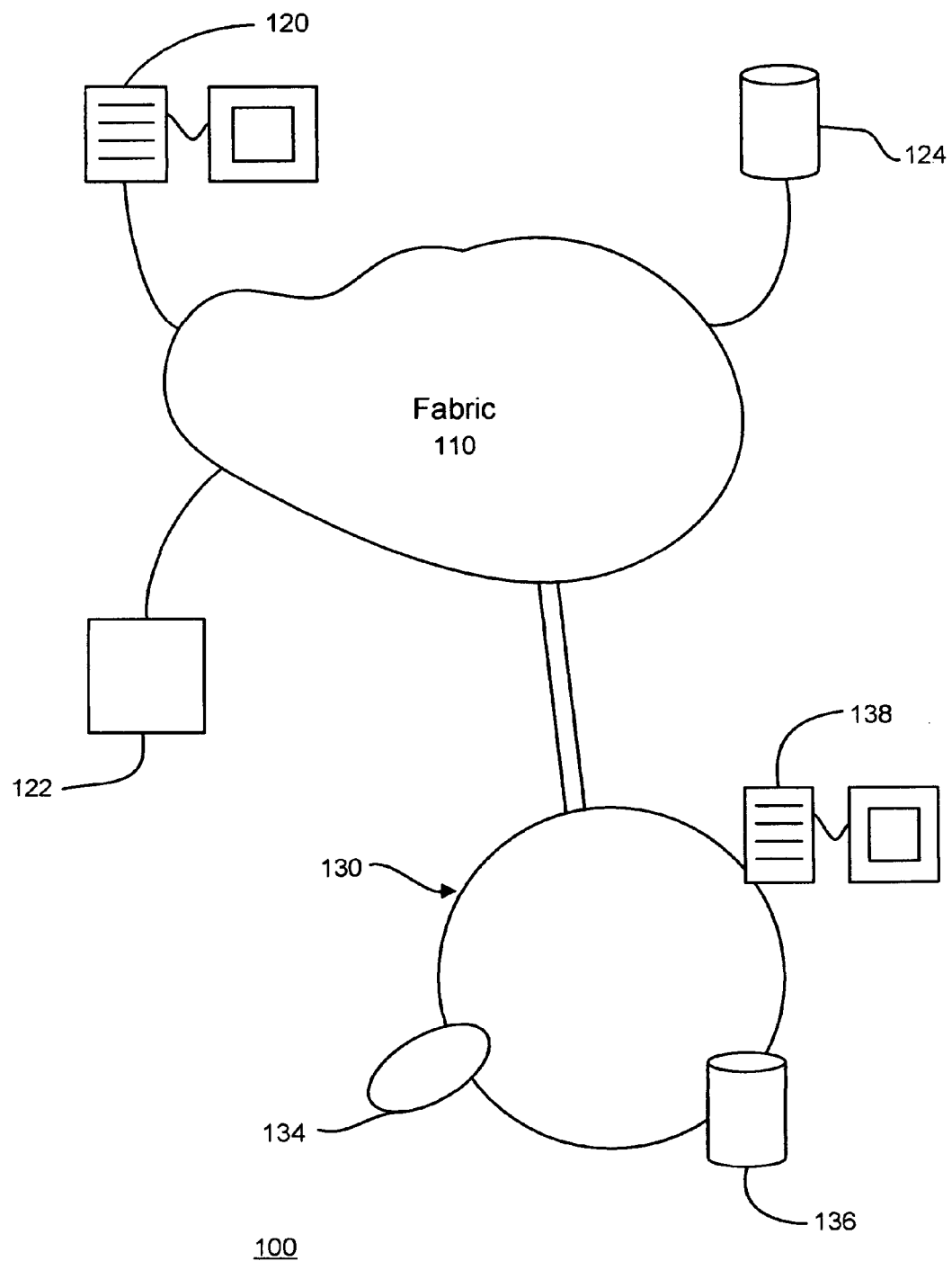
FIG. 1 is a schematic diagram illustrating an embodiment of a communications network system including a switch fabric.

Embodiments of systems, apparatuses, devices and/or methods for data communications networking are described. In the following description, numerous specific details are set forth. However, it is understood that the described embodiments may be practiced without these specific details. In other instances, well-known circuits, structures and/or techniques have not been shown in detail so as not to unnecessarily obscure the provided description.

Reference throughout this specification to "one embodiment" and/or "an embodiment" means that a particular feature, structure, and/or characteristic described may be included in at least one embodiment. Thus, the appearance of the phrases "in one embodiment" or "in an embodiment" in various places throughout this specification typically does not refer to one particular embodiment or necessarily to the same embodiment. Furthermore, various features, structures, and/or characteristics described through out this specification may be combined in any suitable manner in one or more embodiments.

Embodiments of the claimed subject matter are well suited to a variety of networking applications and/or systems, such as computer network systems, employing a variety of different topologies, including, for example, storage area networking (SAN), although, of course, the claimed subject matter is not limited in scope in this respect: In such an embodiment, although the claimed subject matter is not limited in scope in this respect, a configuration may be employed in which management is accomplished of large networks comprised of storage devices, computers, other computing platforms, and/or the like, that are communicatively coupled to dissimilar storage devices, computers, other computing platforms, and/or the like. Typically, this may be accomplished over a Fibre Channel compliant topology, although, again, the claimed subject matter is not limited in scope to employing Fibre Channel compliant protocols and/or devices that are Fibre Channel compliant necessarily.

Reference will now be made in detail to several embodiments of the claimed subject matter, samples of which are illustrated in the accompanying drawings. When practicable, the same or similar reference numerals will be used throughout the drawings to refer to the same or similar components, parts, or other objects.

FIG. 1 is a schematic diagram of an embodiment of a Fibre Channel compliant communications network system 100. Again, Fibre Channel protocols are merely used as a reference point and the claimed subject matter is not limited in scope to an embodiment employing Fibre Channel. In this embodiment, these devices are included in a storage area network (SAN). Likewise, example nodes include hosts and target devices, such as RAID units, JBOD units and tape libraries. Again, these examples are merely provided for purposes of illustration and the claimed subject matter is not limited in scope to these example embodiments.

However, embodiment 100 further comprises a switch fabric 110 and a plurality of devices, such as 120, 122, 124, and/or groups of devices, such as 134, 136, and 138, as indicated with respect to logical loop 130, for example. In general, a switch fabric, such as fabric 110, may be communicatively coupled to various devices, such as, here, 120, 122, and 124, and may operate as a switching network to allow these devices to communicate with each other. Devices 120, 122, and 124 may comprise any type of device, such as, for example, a computing platform, a storage device, and/or the like, and are typically communicatively coupled via fabric 110 by employing point-to-point communications technology or techniques. In this particular embodiment fabric 110 is also in communication with logical loop 130. Loop 130 here includes devices 134, 136 and 138. In this particular embodiment, loop 130 comprises an arbitrated loop with ring couplings for providing multiple nodes with the ability to arbitrate access to shared bandwidth. It is, of course, appreciated that this particular embodiment is merely an illustrative example and the claimed subject matter is not limited in scope in any way to this particular embodiment.

In this particular embodiment, fabric 110 comprises a variety of communicatively coupled Fibre Channel compliant switches. Although in this particular embodiment, Fibre Channel compliant switches are employed, references throughout this specification to "a switch" or to "switches" is intended to refer to a generic switch rather than to a Fibre Channel compliant switch or to switches that only comply with Fibre Channel protocols. In this context, then, the term switch refers to a device that includes a processor and memory and that is adapted to or has the capability to route frames or packets between two or more separate devices.

It is likewise noted that such switches typically include a variety of ports. For switches that comply with the Fibre Channel protocol or standard, the switch ports may include one or more E-ports, FL-ports and/or F-ports, although the claimed subject matter is not limited in scope in this respect. Furthermore, in general, switches that route frames through a network may employ source identifiers and destination identifiers, typically such identifiers being included as part of the frames being routed, to assist in making routing decisions. Typically, such switches also include routing tables that are contained within the switch, in hardware, firmware, and/or software form, or any combination thereof, depending upon the particular embodiment, and are employed to route frames throughout the network, as described in more detail hereinafter.

Figure 2:
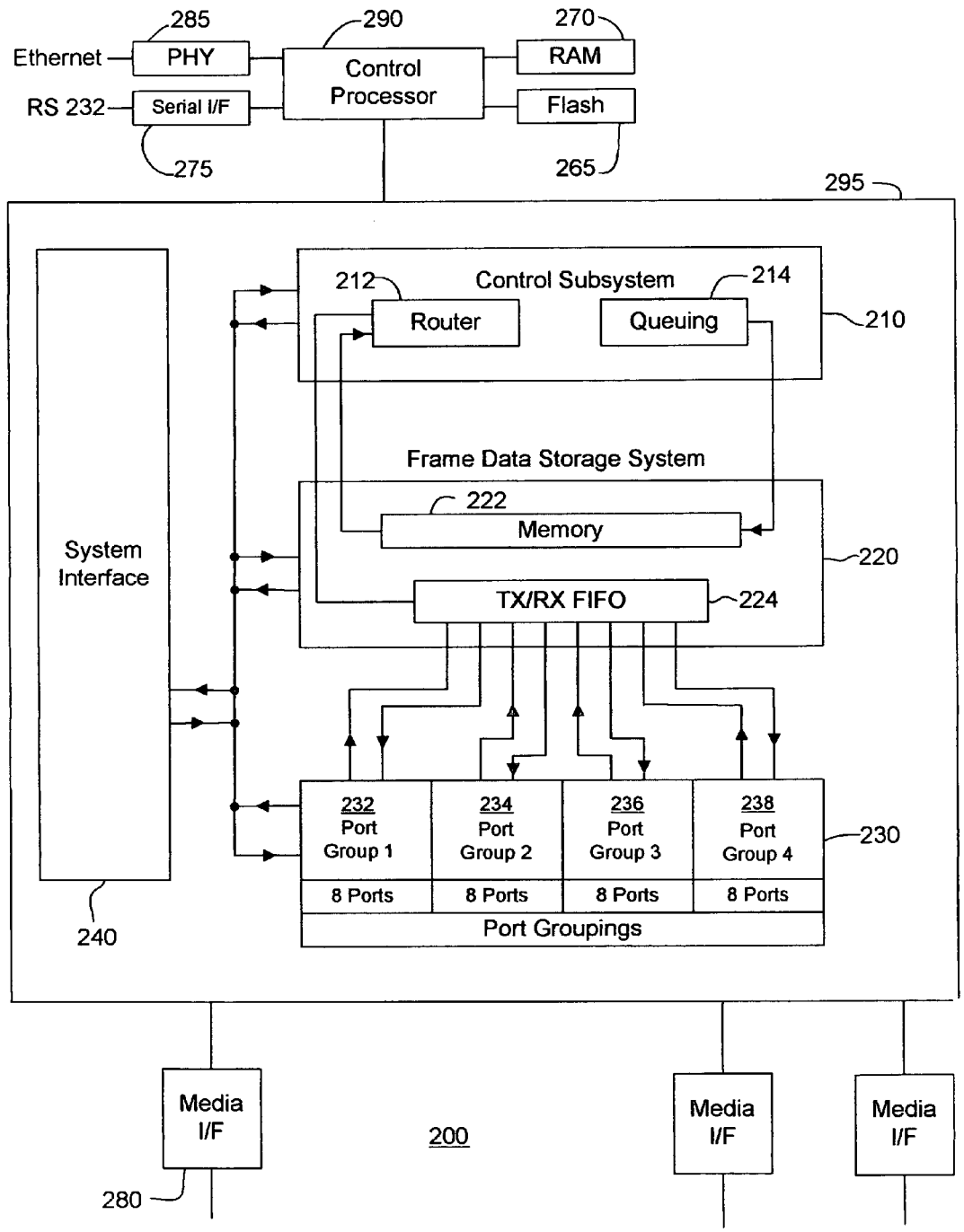
FIG. 2 is a block diagram illustrating an embodiment is a switch, such as a Fibre Channel compliant switch.

Although the claimed subject matter is not limited in scope to this embodiment, FIG. 2 illustrates an embodiment of a switch in accordance with the claimed subject matter. Embodiment 200 includes a control processor 290, an ASIC 295, a PHY 285, a media interface (I/F) 280, a serial interface 275, a RAM, 270 and flash memory 265, as well as other components. In this embodiment of a switch, the ASIC includes a control subsystem 210, a frame data storage system 220, port groupings 230, and an overall system interface 240. It is noted that FIG. 2 simply illustrates a potential architecture of a switch in accordance with the claimed subject matter. This architecture is provided only as an example and many other switch architectures are possible. The claimed subject matter is not limited to this or to any other particular architecture. This particular architecture offers versatility in some respects and may be employed in a variety of system configurations including a switch fabric configuration and/or a core-edge switch configuration, for example; however, it is to be understood the following description and the claimed subject matter is not at all dependent upon this particular or any other particular switch architecture.

As previously described, one aspect of communications data networking, such as for Fibre Channel compliant systems, may include the delivery of frames "in order." As also previously described, this may result in issues, such as congestion and/or underutilization of available paths through the network. One approach to addressing these issues is described in detail in co-pending patent applications, U.S. patent application Ser. No. 09/872,412, titled "Link Trunking and Measuring Link Latency In Fibre Channel Fabric," filed on Jun. 1, 2001, by David C. Banks, Kreg A. Martin, Shunjia Yu, Jieming Zhu and Kevan K. Kwong; and U.S. patent application Ser. No. 10/059,760, titled "Dynamic Path Selection with In-Order Delivery within Sequence," filed on Jan. 29, 2002, by Ezio Valdevit, U.S. Publication No U.S. 2002/0156918 A1; both of the foregoing assigned to the assignee of the presently claimed subject matter and hereby incorporated by reference.

Figure 3:
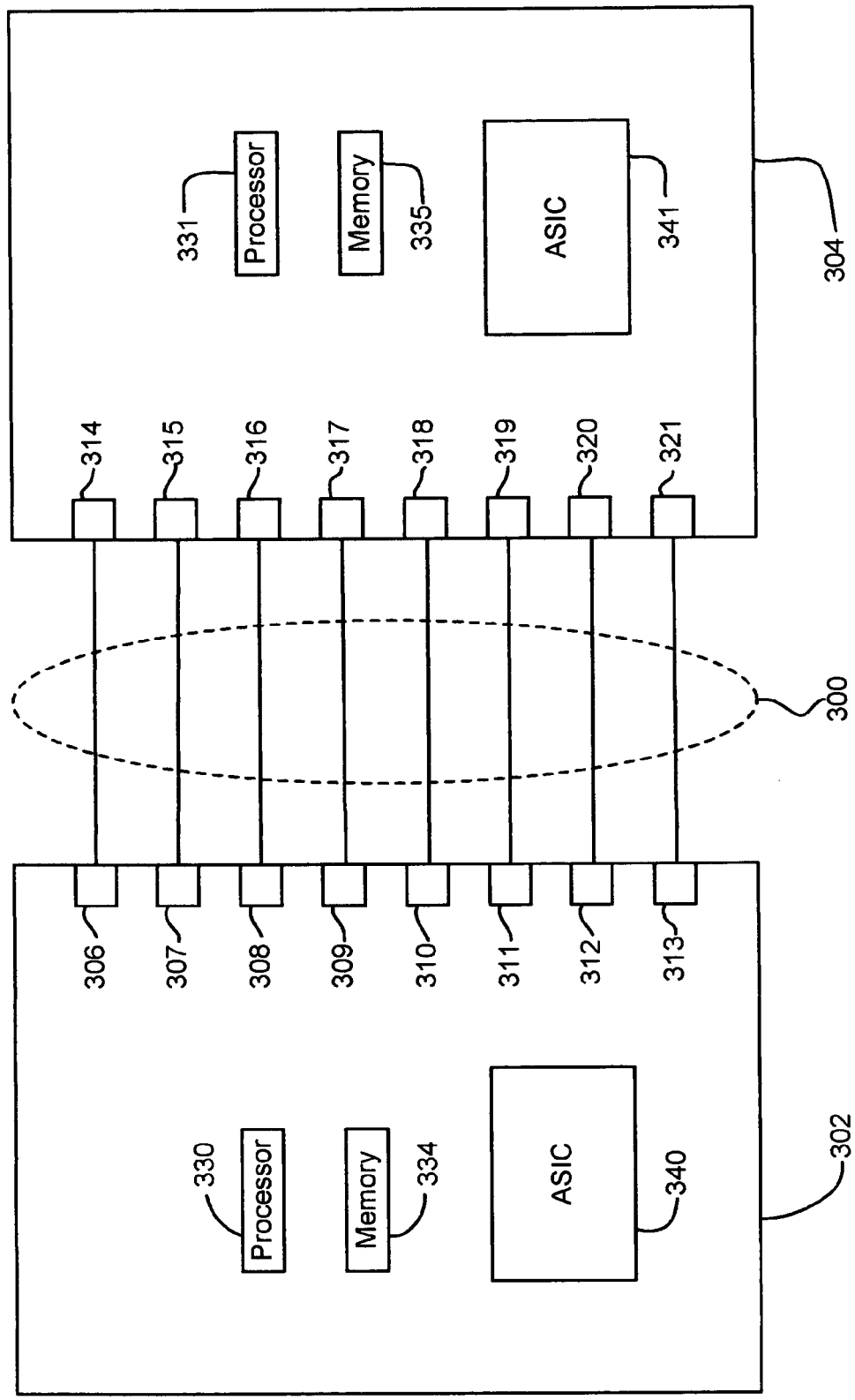
FIG. 3 is schematic diagram illustrating one embodiment of trunking.
Figure 4:
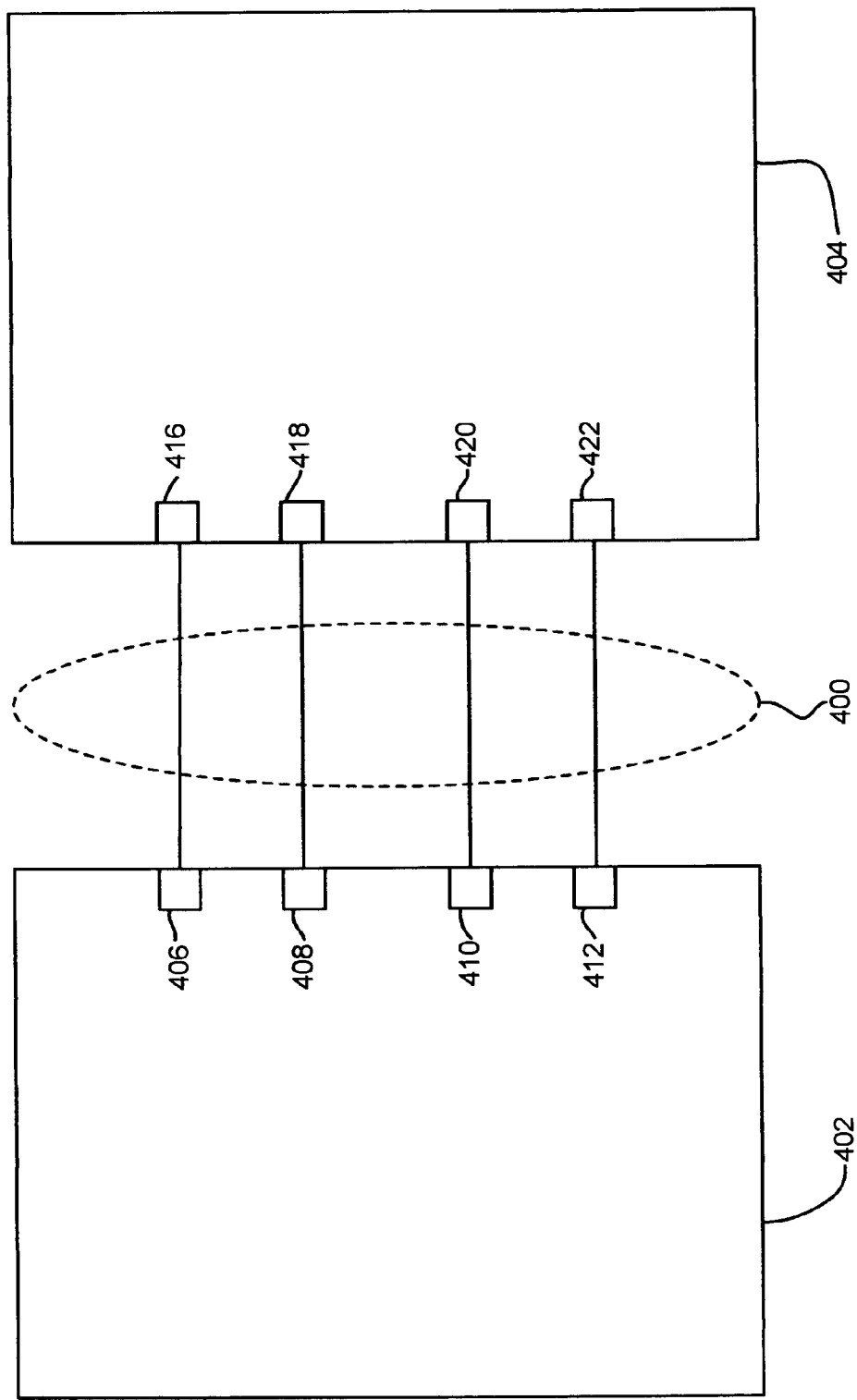
FIG. 4 is a schematic diagram illustrating another embodiment of trunking.

Although the claimed subject matter is not limited in scope to employing the approach described in the foregoing patent applications, these applications describe a technique referred to here as trunking or employing a trunked group of links, which may allow frames to take a variety of alternate paths and still be delivered "in-order" at the desired destination. Although, again, the claimed subject matter is not limited in scope in this respect, as described in the foregoing patent applications, trunking may be performed over eight "links" such as depicted in FIG. 3, for example. It is noted that in the foregoing patent applications, trunking is performed, instead, using four links, such as illustrated, for example, in FIG. 4; however, as will be appreciated, the claimed subject matter is not limited to employing a particular number of links in a trunked group. The reference numerals in FIG. 4 correspond to those in FIG. 3 of like form. For example, switches 402 and 404, trunked group 400, and ports 406422 correspond to switches 302 and 304, trunked group 300 and ports 306-321. Therefore, any number of links may be employed depending upon the particular embodiment, such as either four links or eight links.

Thus, FIG. 3 depicts a block diagram illustrating an embodiment of adjacent switches in which trunking is employed. In this particular embodiment, switches 302 and 304 are coupled together by a set of links, also referred to as inter-switch links or ISLs. In this embodiment, the links (and associated ports) comprise a trunked group 300. Thus, in this particular embodiment, frames are distributed across a set of alternate paths or ISLs, linking adjacent switches 302 and 304. It is noted that buffering is not necessarily employed in the path between the switches to perform balancing of the frame traffic.

The particular implementation details of trunking as described in the foregoing patent applications shall not be discussed here to conserve space and to avoid unnecessary repetition; however, in general, as described in the foregoing patent applications, trunking treats a group of ISLs as a logical pipe. By doing so, frames received at one switch may be transmitted to an adjacent switch, for this particular embodiment, after being roughly at least evenly disbursed over the ISLs within the trunked group so that congestion over a particular ISL may be reduced and/or underutilization of a particular ISL may also be reduced. Trunking, thus, is beneficial, for example, as just described, at least in part because it enables frame traffic to be at least roughly evenly distributed across available ISLs while preserving in-order delivery. For this particular embodiment, ports 306-322 that belong to the trunked group 300 are referred to as trunking ports.

Likewise, switches 302 and 304 may include a central processing unit (CPU) or other module, integrated therein. These modules typically include a processor, such as, for example, a microprocessor, with a local memory module, such as, for example, cache memory. In this particular embodiment, a processor, such as 330 or 331, and memory, such as 334 or 335, may generally be employed for the initialization of the switch, although, of course, the claimed subject matter is not limited in scope in this respect. Additional components or constructs may include virtual channels and/or queues, for queuing up frames to be transmitted from the switch, timers, additional memory registers, logical routing tables, etc. Although the claimed subject matter is not limited in scope in this respect, these additional components may be embodied within an ASIC, such as 340 or 341, embedded within the respective switches, such as, for example, 302 and 304. Of course, again, this is merely one example embodiment.

Nonetheless, as described in the foregoing applications, trunking between ports of two switches, for example, as depicted in FIG. 3, for example, is typically accomplished by utilizing specifically identified physical ports on the switches. In some situations, however, limiting trunking to specifically identified physical ports may reduce the flexibility of the switch configuration. For example, it may be desirable to trunk different ports together as a trunked group, depending upon the particular switch configuration being employed. Greater flexibility, therefore, may be possible by performing trunking using logical ports rather than physical ports, as described in more detail hereinafter. Furthermore, although the claimed subject matter is not limited in scope in this respect, employing logical ports may also provide better frame traffic balancing and/or better switch utilization.

In one particular embodiment, therefore, instead of employing dedicated physical ports of a switch to perform trunking and routing of a flow of "in order" frames via dedicated physical switch ports, alternately, a correspondence may be employed between logical ports and physical ports of a switch. In this context, the term "logical port" refers to a port of a switch that comprises a collection of one or more physical ports, regardless of the location of the physical port on the switch. Typically, although not necessarily, such a correspondence between logical ports and physical ports may be stored in tables on a given switch, in hardware, firmware, and/or software, or any combination thereof, depending upon the particular embodiment.

In such an embodiment, balancing of frame traffic through the switch employing the trunking techniques described in the foregoing patent applications, for example, may be employed, although again the claimed subject matter is not limited in scope this respect. In this context, frame traffic includes frames exiting a particular switch via the physical ports of the switch. In this particular embodiment, however, the selected physical port for a frame exiting the switch may be selected based in least in part on the previously described correspondence between logical ports and physical ports. For example, balancing frame traffic over a set of links may be accomplished by employing trunking. However, in this instance, the links may couple logical ports between adjacent switches, for example, rather than physical ports between switches. Likewise, logical ports may comprise more than one physical port distributed over the switch, depending on the particular embodiment. For example, one logical port may correspond to one or more physical ports in this particular embodiment. However, in general, any and all potential correspondences between physical ports and logical ports, regardless of arrangement, are included within the scope of the claimed subject matter. In the embodiment described above and shown in FIG. 3, eight such links were employed to comprise a trunked group, although the claimed subject matter is not limited in scope in this respect.

However, regardless of the number of links employed, in an embodiment such as this particular embodiment, balancing frame traffic via the links may be accomplished by applying a pseudo-random process to select a particular port as an egress port. Thus, here, a particular port may be selected from among available logical ports, here, the particular port being selected for a particular frame of the frames exiting the switch. For example, although, again, the claimed subject matter is not limited in scope in this respect, a pseudo-random process may comprise applying a hash function to a set of parameters. Of course, any pseudo-random process may be employed and such an embodiment will remain within the scope of the claimed subject matter.

Although the scope of the claimed subject matter is not limited in scope in this respect, as one example, a destination identifier (DID), source identifier (SID) and exchange identifier (OXID) may be employed as hash function parameters. Additionally, an identifier for a receiving switch (RXID), and a receiving port (RXPORT) may be employed in some embodiments. Of course, additional parameters or different parameters may also be employed.

In this particular embodiment, however, once the pseudo-random process is employed to select from the available logical ports, such as by applying a hash function, for example, the previously described correspondence may then be employed to determine the physical port to which to route the particular frame based at least in part on the logical port selected as the particular port. Thus, applying a pseudo-random process, such as, for example, a hash function, balances traffic across logical ports in a switch in this embodiment. Nonetheless, logical ports may exist in a single switch or, for example, in the case of core-edge architectures, across multiple switches and multiple chips. A logical port for a given switch, therefore, comprises a collection of one or more physical ports in this particular embodiment.

It is noted that while, in this particular embodiment, all of the ports employed to accomplish trunking, as previously described, may comprise logical ports, the claimed subject matter is not limited in scope in this respect. For example, in an alternative embodiment, a mixture of logical ports and physical ports may be employed by the switch to form a trunked group. In such an embodiment, then, some frames may be routed directly to a selected physical port based at least in part on application of a pseudo-random process (that is, without employing a logical port), while, for other frames, a logical port may be selected based at least in part on application of a pseudo-random process, and then, a correspondence between logical ports and physical ports may be employed to route the frame to the associated physical port. Of course, this is merely an example of an alternative approach.

In another alternative embodiment, when a frame is received by a switch, the switch may add tags or other identifying information to the frame. For example, in one embodiment, a source tag, destination tag, and/or other identifying information may be added (e.g., STAG and/or DTAG, not to be confused with SID and DID). These tags and/or other identifying information may then be employed to route the frame to a particular switch egress port based at least in part on routing tables contained in the switch. A variety of schemes to accomplish this are possible and the claimed subject matter is, of course, not limited to a particular routing table scheme. For example, one or more of the tags or sub-portions of the tags may be employed to perform table lookups for particular switch routing tables. Then, these tags and/or other identifying information may be stripped off the frames as they exit the switch. One advantage of such an approach is that it may provide flexibility in routing frames in multi-fabric environments, where, for example, DIDs and/or other frame identifiers may not be unique. Thus, such tags and/or other identifying information may label frames as belonging to a particular fabric, for example. Likewise, the tags may be assigned to be associated with switch logical ports so that logical switch port trunking, as previously described may be employed.

For example, in one embodiment, a hash function or other pseudo-random process, using as parameters, DID, SID, OXID, RXID, RXPORT, STAG and/or DTAG, or any combination thereof, may be employed to perform trunked routing. For example, if $$Hvalue=HASH\ (parameters)$$

returns a pseudo-random value. In one potential embodiment, where N provides the number of alternative paths, S provides an offset for the index of a routing table, and I provides the routing table index, then the following may be employed in one embodiment:

$$I=S+(Hvalue\ modulo\ N)$$

$$selected\ port=Entry\ [I]$$

where Entry [*] returns the value of the routing table at location I.

Of course as previously suggested, the claimed subject matter is also not limited in scope to employing trunking. In an alternative embodiment, for example, a technique for balancing frame traffic in a network that includes communication paths having different bandwidths may be employed. One such technique is described in co-pending U.S. patent application Ser. No. 10/208,969, titled "Load Balancing in a Network Comprising Communication Paths Having Different Bandwiths," filed on Jul. 31, 2002, by Ezio Valdevit and Vineet Abraham, assigned to the assignee of the presently claimed subject matter and herein incorporated by reference. However, the claimed subject matter is not limited in scope to the approach employed in the foregoing patent application, of course.

In such an approach, nonetheless, a cost value or weight may be assigned to links in a network based on a variety of potential criteria. The total cost of employing particular paths of the network between switches may then be computed based at least in part on the assigned weights and frame traffic may be balanced among a variety of paths to produce a lower cost path from among the alternative paths. The implementation details of the foregoing patent shall not be discussed here to conserve space and to avoid unnecessary repetition; however, for an embodiment of the presently claimed subject matter, balancing of frame traffic may also be accomplished by applying weights, rather than, for example, employing a pseudo-random process. For example, a particular port may be selected from among available logical ports of the switch, although in this particular embodiment, weights may be employed, rather than a pseudo-random process, to determine a path for the particular frame. Once a logical port is selected, however, the previously described correspondence may be employed to determine the physical port to which to route the particular frame based at least in part on the selected logical port. Likewise, as previously described, such a technique may be applied by mixing logical ports and physical ports. In such an embodiment, then, some frames may be routed directly to a selected physical port based at least in part on application of the previously described process (that is, without employing a logical port), while, for other frames, a logical port may be selected, and then, a correspondence between logical ports and physical ports may be employed to route the frame to the associated physical port.

Referring again to trunking, as previously described, frame traffic may be balanced over a set of links referred to as a trunked group. Likewise, as previously indicated, the claimed subject matter is not limited in scope to the number of links or exit ports employed in one particular group. However, even for those embodiments in which trunked groups take on a variety of sizes, it may be desirable to have the capability to balance frame traffic across or between at least two trunked groups, regardless of the size of the particular trunked groups themselves.

A process may, therefore, in this particular embodiment, be applied to select an exit port of a switch from a set of possible exit ports. A particular frame from a flow of frames, thus, may exit a selected exit port so as to potentially reduce frame traffic congestion along potential routes that include the set of possible exit ports. In addition, the set of possible exit ports may include at least some of the exit ports of at least two trunked groups. Again, such an embodiment may be employed irrespective of the size of the trunked groups themselves, which may comprise, for example four links or exit ports, eight links or exit ports, or varying numbers of links or exit ports, although, again, the claimed subject matter is not limited in scope to the number of exit ports or links comprising a particular trunked group.

In one embodiment, a process may comprise applying a pseudo-random process, such as, in one particular embodiment, applying a hash function, although the claimed subject matter is not limited in scope to applying hash function, of course. The hash function, nonetheless, may be applied, at least for some frames, to a set of parameters. In one embodiment, the set of parameters may reflect information about the frames to which the hash function is applied, in order to select an exit port from the set of possible exit ports, for example, as previously described.

However, rather than employing a pseudo-random process to select an exit port, in an alternative embodiment, weights may be employed, similar, for example, to an embodiment discussed above. For example, a weight may respectively be assigned to at least some of respective ones of exit ports from a set of possible exit ports through which a frame may exit. In such an embodiment, a process may be applied to select an exit port of the switch so as to potentially reduce frame traffic congestion along potential routes that include a set of possible exit ports. In this embodiment, the process may comprise, for example, employing the weights to select an exit port so that the overall cost, based, at least in part, on the weights applied, is as good as or better than alternative exit ports in terms of achieving an objective function that may be reflected by the weights. For example, although the claimed subject matter is not limited in scope in this respect, the weights may, at least in part, reflect consumed bandwidth associated with having frames travel particular routes of the network that include the particular switch.

Nonetheless, it shall be appreciated that this particular embodiment is not limited in scope to an objective function in which "better" is necessarily defined by obtaining a higher value. For example, in this context, "better" with respect to a particular objective function may comprise achieving a lower value objective, depending, for example, on whether the weights employed are positive or negative. Furthermore, at least some exit ports may have multiple weights to reflect routes between the particular exit port and a variety of potential destination ports in the particular network. In such an embodiment, therefore, multiple weights may be employed to select an exit port that is as good as or better than alternative exit ports in terms of achieving an objective function reflected by the multiple weights. Again, achieving the objective function may comprise obtaining a higher value or lower value, depending upon the particular embodiment. Likewise, at least some of the potential routes may be to one or more other switches in a switch fabric or to one or more other switches in a particular network, although, of course, the subject matter is not limited in scope in this respect.

Figure 5:
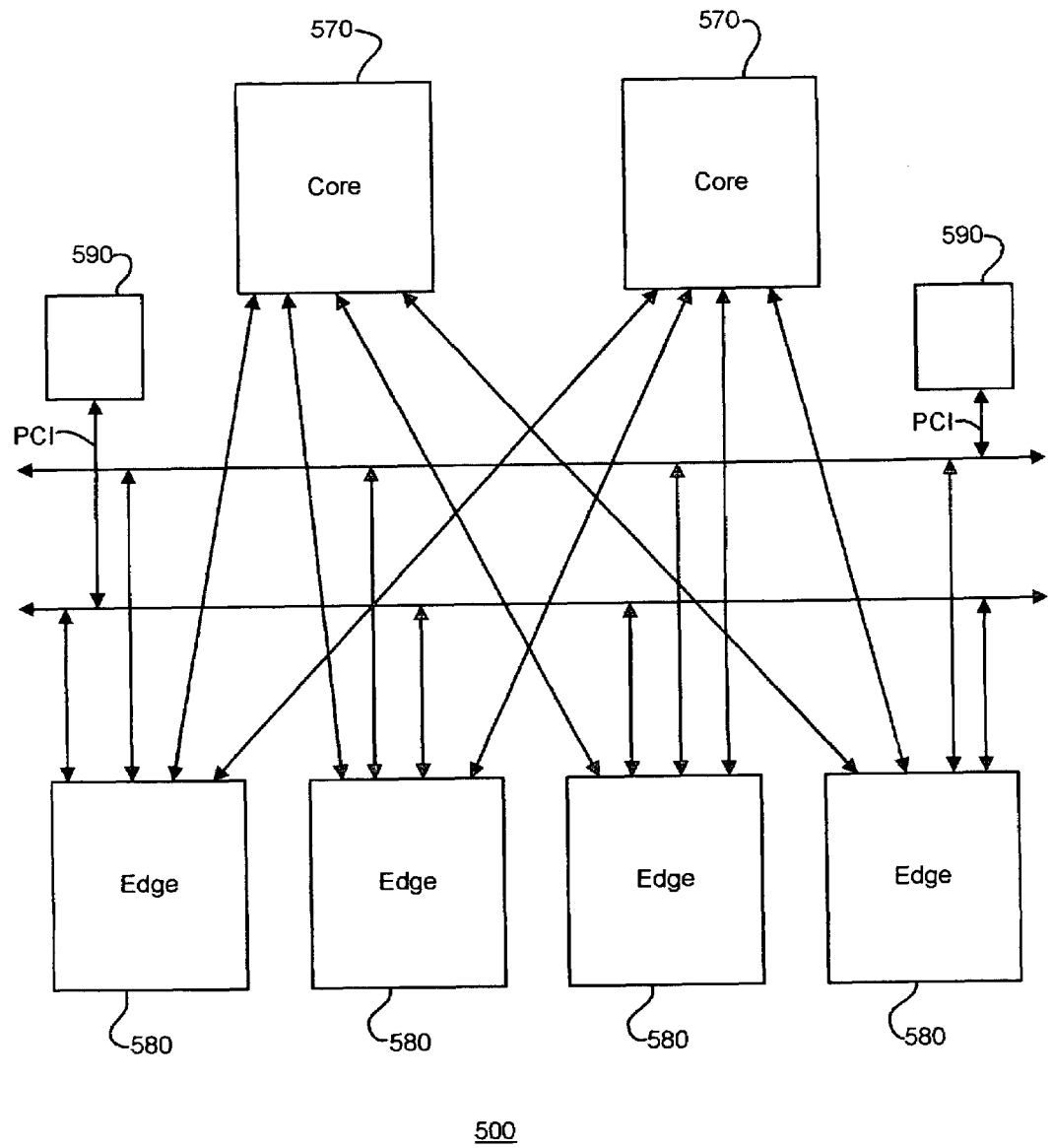
FIG. 5 is a schematic diagram illustrating one embodiment of a core-edge switch configuration.

As previously suggested, one embodiment of a switch in accordance with the claimed subject matter may be employed in a switch fabric and/or in a core-edge switch configuration, although, of course, the claimed subject matter is not limited in scope to only a switch fabric and/or a core-edge switch configuration. FIG. 5, thus, is a schematic diagram of an embodiment demonstrating one potential core-edge switch configuration, although many others are possible within the scope of the claimed subject matter. Thus, an embodiment of a core-edge switch configuration or topology, as illustrated in FIG. 5, may provide a building block for improvements, such as higher port counts and/or modular switches. An edge switch or blade, such as 580, for example, may terminate external Fibre Channel couplings or connections, and core switches or modules, such as 570, for example, may switch blade-to-blade traffic. An edge blade, for example, may provide external Fibre Channel couplings or connections to attach host and storage host bus adapters (HBAs,) as well as to other switches over E-ports, for example, where Fibre Channel is employed. In addition, the edge blades 580 may provide internal connections or coupling to the core modules of the configuration. Furthermore, in the embodiment shown in FIG. 5, devices 590 may provide control via PCI compliant busses, although, of course, the claimed subject matter is not limited in scope to this particular architecture, to employing PCI compliant busses, or to the number of core and/or edge switches depicted.

A variety of techniques for routing a flow of "in order" frames for a core-edge switch configuration are possible. In one particular embodiment, it is desirable to select a route for a frame of the flow that potentially reduces frame traffic congestion, in comparison with other potential routes. Such an embodiment may include the following. For example, as described in connection with other embodiments, a pseudo-random process may be applied. In this particular embodiment, for example, a hash function may be applied, such as the previously described hash function, although, of course, other pseudo-random processes and/or other hash functions may also be employed.

In one particular embodiment, a hash function may be applied to a set of possible routes to exit ports of a core switch, such as switch 510 of a core-edge switch configuration, to balance the flow of frames out of exit ports of the core switch. Thus, for such an embodiment, a pseudo-random process is applied so as to at least roughly evenly distribute frames exiting exit ports of the core switch. In an alternative embodiment, however, a hash function and/or other pseudo-random process may be applied to a set of possible routes to external exit ports of a core-edge switch configuration to balance the flow of frames out of the external exit ports. In a core-edge configuration, the external exit ports comprise exit ports of the edge chips. Thus, in this particular embodiment, in contrast with the previously described embodiment, the flow of frames out of external exit ports of the switch-edge configuration is at least roughly evenly balanced. In this example, as previously indicated, exiting the exit ports of the edge switches comprises exiting the core-edge switch configuration. In some contexts, this may be referred to as "spraying" and/or "spraying frames."

Another embodiment of spraying, however, may be employed in a core-edge switch configuration from the edge switch that receives the frame in the particular configuration, here the ingress switch of the configuration for that frame, to a core switch in the configuration. Thus, depending upon the number of core switches in the particular configuration, a pseudo-random process may be applied to select a core switch and/or to select a route to a selected core switch, such as, for example, a hash function. In this manner, frames may be "sprayed" from ingress switches to core switches of the configuration. Once the frames arrive, the receiving core switch may them employ a variety of routing techniques, such as those described, to route the frames to egress switches for the particular configuration.

In yet another alternative embodiment, a hash function and/or other pseudo-random process may be applied to possible routes through the core-edge configuration to balance the flow of frames through the configuration to a particular exit port of the configuration. In such an embodiment, as in the previously described embodiment, an external exit port of the core-edge switch configuration comprises an exit port of an edge switch of the core-edge configuration. Thus, in this particular embodiment, a hash function and/or other pseudo-random process is applied so that possible alternative routes through the configuration are at least roughly evenly balanced, instead of balancing the flow of frames out of the external exit ports of the configuration, as accomplished in previously described embodiments, for example. These, of course, are merely examples of various techniques within the scope of the claimed subject matter that may be applied to balance frame traffic in a core-edge switch configuration.

Likewise, additional embodiments are possible and included within the scope of the claimed subject matter. For example, alternatively, rather than applying a pseudo-random process to at least roughly evenly balance the flow of frames, instead, weights may be employed to balance frame traffic and/or reduce potential congestion in a core-edge switch configuration. Likewise, a variety of approaches to applying weights may be employed. For example, in one embodiment, a weight may respectively be assigned to at least some respective one of the exit ports of a core switch of a core-edge switch configuration. In such an embodiment, a process may be applied to select a route for a frame of a flow of "in order" frames so as to potentially reduce frame traffic congestion in the core-edge switch configuration. In such a process, weights may be employed to select an exit port of the core switch so that the selected route is as good as or better than alternate exit ports in terms of achieving an objective function reflected by the weights. Of course, in this particular embodiment, "better" in terms of achieving an objective function may comprise either obtaining a higher value objective or obtaining a lower objective function depending, for example, upon the particular embodiment. Likewise, as previously described, in one embodiment, although, again, the claimed subject matter is not limited in scope in this respect, the weights may, at least in part, reflect consumed bandwidth associated with having frames travel along particular routes.

In yet another embodiment, some exit ports may have multiple weights to reflect routes from particular exit ports to multiple respective destination ports. In such an embodiment, thus, a process may employ multiple weights to select an exit port of the core switch that is as good as or better than an alternative exit ports in terms of achieving an objective function reflected by the multiple weights. Again, as previously described, "better" in terms of achieving an objective function may comprise obtaining a higher value objective function or a lower value objective function. Likewise, multiple weights employed may at least reflect consumed bandwidth associated with having frames travel along particular routes. Furthermore, in one embodiment, at least some of the potential routes may be to one or more other switches in a switch fabric or to one or more other switches in a particular network, although again the claimed subject matter is not limited in scope in this respect.

In still another embodiment, weights may be applied to select an exit port of edge switches of the core-edge switch configuration, rather than to select an exit port of the core switch, as described above. Thus, in this particular embodiment, multiple weights may reflect routes from the particular exit port to multiple respective destination ports and be employed to select an exit port of an edge switch that is as good as or better than alternative exit ports of edge switches of the configuration in terms of achieving an objective function reflected by the weights. In this particular embodiment, again, an exit port of an edge switch comprises an exit port the core-edge switch configuration itself. Likewise, again, "better" may comprise obtaining a higher value objective function or a lower value objective function depending upon the particular weights.

In even yet another embodiment, weights may be applied to select a route from among possible routes through the core-edge configuration to balance the flow of frames through the configuration to a particular exit port of the configuration. In such an embodiment, as in the previously described embodiment, an external exit port of the core-edge switch configuration comprises an exit port of an edge switch of the core-edge configuration. Thus, in this particular embodiment, the weights may be applied so that possible alternative routes through the configuration to a particular exit port are balanced, reflected at least in part by the weights, instead of balancing the flow of frames out of the external exit ports of the configuration, as accomplished in previously described embodiments, for example.

In summary, in a core-edge switch configuration, a variety of techniques to route frames are possible in order to reduce traffic congestion and/or balance flow. One technique may include balancing the flow of a set of external exit ports of the core-edge configuration. Another technique may include balancing the flow to a particular external exit port. Likewise, a further technique may include balancing the flow out of the exit ports of a particular switch, e.g., a core switch, or balance the flow to a particular exit port. Furthermore, several techniques are available to balance flow in the previously described techniques, such as applying a pseudo-random process and/or applying weights. Yet another technique may include a source tag, a destination tag, and/or other information available about the packets they are received by particular switches that may be employed to route the packets in the configuration.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. For example, software may be employed to initialize a switch, such as by initializing the correspondence between logical ports and physical ports and/or initialing the switch to have the capability to balance frame traffic. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and configurations were set forth to provide a thorough understanding of the claimed subject matter. However, it should be apparent to one skilled in the art having the benefit of this disclosure that the claimed subject matter may be practiced without the specific details. In other instances, well-known features were omitted or simplified so as not to obscure the claimed subject matter. While certain features have been illustrated and described herein, many modifications, substitutions, changes and/or equivalents will now occur to those skilled in the art. It is, therefore, to be understood that the appended claims are intended to cover all such modifications and/or changes as fall within the true spirit of the claimed subject matter. The description is thus to be regarded as simply illustrative and is intended in no way to limit the scope of the claimed subject matter.

What is claimed is:

1. A method of routing a flow of frames for a core-edge switch configuration, the core-edge switch configuration configured to receive frames at an edge switch, route the frames to a core switch and then route the frames to an edge switch for transmission, the method comprising:

receiving at least one frame of the flow of frames at an edge switch of the core-edge switch configuration;

applying a process at one switch in the core-edge switch configuration to select a route through at least two switches forming the core-edge switch configuration for said at least one frame of the flow of frames to balance frame traffic through the core-edge switch configuration; and transmitting said at least one frame from an edge switch of the core-edge switch configuration.

2. The method of claim 1, wherein said process comprises a pseudo-random process.

3. The method of claim 2, wherein applying said pseudo-random process comprises applying a hash function.

4. The method of claim 3, wherein said hash function is applied to possible routes through the core-edge switch configuration to balance the flow of frames through the core-edge switch configuration to an external exit port of the core-edge switch configuration.

5. The method of claim 1, wherein said process comprises applying weights

6. The method of claim 5, wherein said weights are applied to possible routes through the core-edge switch configuration to balance the flow of frames through the core-edge switch configuration to an external port of the core-edge switch configuration.

7. The method of claim 1, wherein said route is selected based at least in part on a source tag and/or a destination tag added to said frame after said frame enters a switch of the core-edge switch configuration.

8. The method of claim 7, wherein said source tag and/or said destination tag is stripped off said frame before said frame exits the core-edge switch configuration.

9. The method of claim 1, wherein said switches of said configuration comprise Fibre Channel compliant switches.

10. A switch fabric comprising:
at least a first switch and a second switch, said first and said second switch being communicatively coupled;
said first switch including:
at least two core switches;
at least two edge switches coupled to said at least two core switches so that a flow of frames is from an edge switch to a core switch to an edge switch to develop a core-edge switch configuration; and
routing logic associated with a switch which selects a route through at least two switches forming said core-edge switch configuration for a frame of said flow of frames to balance the frame traffic through said core-edge switch configuration.

11. The switch fabric of claim 10, wherein said routing logic pseudo-randomly selects a route for said frame of said flow of frames.

12. The switch fabric of claim 11, wherein said routing logic pseudo-randomly selects said route by applying a hash function.

13. The switch fabric of claim 12, wherein said routing logic applies said hash function to possible routes through said core-edge switch configuration to balance the flow of frames through said core-edge switch configuration to an external exit port of said core-edge switch configuration.

14. The switch fabric of claim 10, wherein said routing logic applies weights to select said route.

15. The switch fabric of claim 14, wherein said weights are applied to possible routes through said core-edge switch configuration to balance the flow of frames through said core-edge switch configuration to an external port of said core-edge switch configuration.

16. The switch fabric of claim 10, wherein said routing logic selects said route based at least in part on a source tag and/or a destination tag added to said frame after said frame enters a switch of said core-edge switch configuration.

17. The switch fabric of claim 16, wherein one of said core or edge switches strips said source tag and/or said destination tag off said frame before said frame exits said core-edge switch configuration.

18. The switch fabric of claim 10, wherein said first and second switches comprise a Fibre Channel compliant switches.

19. An apparatus comprising:
a switch, said switch including:
at least two core switches;
at least two edge switches coupled to said at least two core switches so that a flow of frames is from an edge switch to a core switch to an edge switch to develop a core-edge switch configuration; and
routing logic associated with a switch which selects a route through at least two switches forming said core-edge switch configuration for a frame of said flow of frames to balance frame traffic through said core-edge switch configuration.

20. The apparatus of claim 19, wherein said routing logic pseudo-randomly selects a route for said frame of said flow of frames.

21. The apparatus of claim 20, wherein said routing logic pseudo-randomly selects said route by applying a hash function.

22. The apparatus of claim 21, wherein said routing logic applies said hash function to possible routes through said core-edge switch configuration to balance the flow of frames through said core-edge switch configuration to an external exit port of said core-edge switch configuration.

23. The apparatus of claim 19, wherein said routing logic applies weights to select said route.

24. The apparatus of claim 23, wherein said weights are applied to possible routes through said core-edge switch configuration to balance the flow of frames through said core-edge switch configuration to an external port of said core-edge switch configuration.

25. The apparatus of claim 19, wherein said routing logic selects said route based at least in part on a source tag and/or a destination tag added to said frame after said frame enters a switch of said core-edge switch configuration.

26. The apparatus of claim 25, wherein one of said core or edge switches strips said source tag and/or said destination tag off said frame before said frame exits said core-edge switch configuration.

27. The apparatus of claim 19, wherein said switch comprises a Fibre Channel compliant switch.

28. A network comprising:
a host;
a physical storage unit; and
a first switch communicatively coupled to said host and said physical storage unit;
said first switch including:
at least two core switches;
at least two edge switches coupled to said at least two core switches so that a flow of frames is from an edge switch to a core switch to an edge switch to develop a core-edge switch configuration; and
routing logic associated with a switch which selects a route through at least two switches forming said core-edge switch configuration for a frame of said flow of frames to balance frame traffic through said core-edge switch configuration.

29. The network of claim 28, wherein said routing logic pseudo-randomly selects said route for said frame of said flow of frames.

30. The network of claim 29, wherein said routing logic pseudo-randomly selects said route by applying a hash function.

31. The network of claim 30, wherein said routing logic applies said hash function to possible routes through said core-edge switch configuration to balance the flow of frames through said core-edge switch configuration to an external exit port of said core-edge switch configuration.

32. The network of claim 28, wherein said routing logic applies weights to select said route.

33. The network of claim 32, wherein said weights are applied to possible routes through said core-edge switch configuration to balance the flow of frames through said core-edge switch configuration to an external port of said core-edge switch configuration.

34. The network of claim 28, wherein said routing logic selects said route based at least in part on a source tag and/or a destination tag added to said frame after said frame enters a switch of said core-edge switch configuration.

35. The network of claim 28, wherein one of said core or edge switches strips said source tag and/or said destination tag off said frame before said frame exits said core-edge switch configuration.

* * * * *